United States Patent
Shojayi et al.

(10) Patent No.: US 8,644,189 B1
(45) Date of Patent: Feb. 4, 2014

(54) WIRELESS COMMUNICATION DEVICE THAT TRANSMITS GEOGRAPHIC LOCATION INFORMATION IN ROUTER ADVERTISEMENT ACKNOWLEDGEMENT MESSAGES

(75) Inventors: Joseph C. Shojayi, Overland Park, KS (US); Jeremy R. Breau, Leawood, KS (US); Frederick C. Rogers, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 445 days.

(21) Appl. No.: 12/707,032

(22) Filed: Feb. 17, 2010

(51) Int. Cl.
*H04L 12/28* (2006.01)

(52) U.S. Cl.
USPC ............ 370/254; 370/252; 370/328; 370/338

(58) Field of Classification Search
None
See application file for complete search history.

(56) References Cited

U.S. PATENT DOCUMENTS

| | | | |
|---|---|---|---|
| 7,376,101 B2* | 5/2008 | Shim et al. ..................... | 370/331 |
| 7,406,064 B2* | 7/2008 | Morishige et al. ............. | 370/331 |
| 7,974,269 B2* | 7/2011 | Takeda et al. .................. | 370/352 |
| 8,520,627 B2* | 8/2013 | Park .............................. | 370/331 |
| 2004/0166857 A1* | 8/2004 | Shim et al. ..................... | 455/436 |
| 2005/0128969 A1 | 6/2005 | Lee et al. | |
| 2006/0056369 A1* | 3/2006 | Morishige et al. ............. | 370/338 |
| 2006/0077932 A1* | 4/2006 | Takeda et al. .................. | 370/331 |
| 2006/0291421 A1* | 12/2006 | Park .............................. | 370/331 |
| 2007/0270143 A1 | 11/2007 | Ishikawa | |
| 2010/0002604 A1* | 1/2010 | Melick et al. .................. | 370/254 |
| 2010/0027508 A1* | 2/2010 | Jee et al. ........................ | 370/331 |
| 2011/0026424 A1* | 2/2011 | Feder et al. .................... | 370/252 |

* cited by examiner

*Primary Examiner* — Michael J Moore, Jr.

(57) ABSTRACT

A wireless communication device receives a router advertisement message transferred by a packet network node. The wireless communication device determines location information that corresponds to its geographic location. In response to the router advertisement message, the wireless communication device generates an acknowledgement message having a header extension that includes the location information. The wireless communication device wirelessly transmits the acknowledgement message for delivery to the packet network node.

14 Claims, 6 Drawing Sheets

US 8,644,189 B1

WIRELESS COMMUNICATION DEVICE THAT TRANSMITS GEOGRAPHIC LOCATION INFORMATION IN ROUTER ADVERTISEMENT ACKNOWLEDGEMENT MESSAGES

TECHNICAL BACKGROUND

Internet Protocol (IP) routers in some IP communication networks transfer router advertisement messages with data to enable user communication devices to communicate over the IP communication networks. In response to the router advertisement messages, the user communication devices transfer acknowledgement messages to packet network nodes in the IP communication networks. Some of these user communication devices can also determine their geographic location through the reception of wireless signals from base stations and/or satellites.

OVERVIEW

A wireless communication device receives a router advertisement message transferred by a packet network node. The wireless communication device determines location information that corresponds to its geographic location. In response to the router advertisement message, the wireless communication device generates an acknowledgement message having a header extension that includes the location information. The wireless communication device wirelessly transmits the acknowledgement message for delivery to the packet network node.

DETAILED DESCRIPTION

Figure 1:
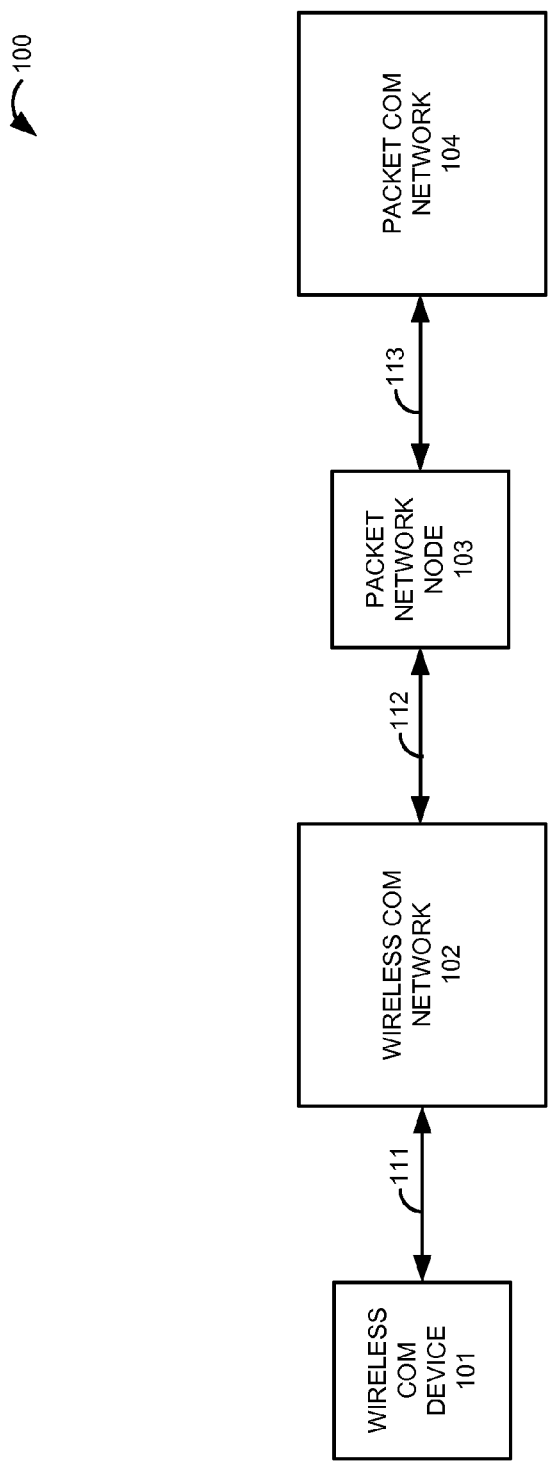
FIG. 1 illustrates a communication system where a wireless communication device provides its geographic location to a packet network node.

FIG. 1 illustrates communication system 100 where wireless communication device 101 provides its geographic location to packet network node 103. Communication system 100 comprises wireless communication device 101, wireless communication network 102, packet network node 103, and packet communication network 104. Wireless communication device 101 comprises an electronic component that is capable of wireless packet communication, such as a computer, telephone, server, camera, e-book, media player, internet appliance, data storage device, and the like.

Wireless communication device 101 and wireless communication network 102 communicate over wireless communication link 111. Wireless communication network 102 and packet network node 103 communicate over communication link 112. Packet network node 103 and packet communication network 104 communicate over communication link 113.

Figure 2:
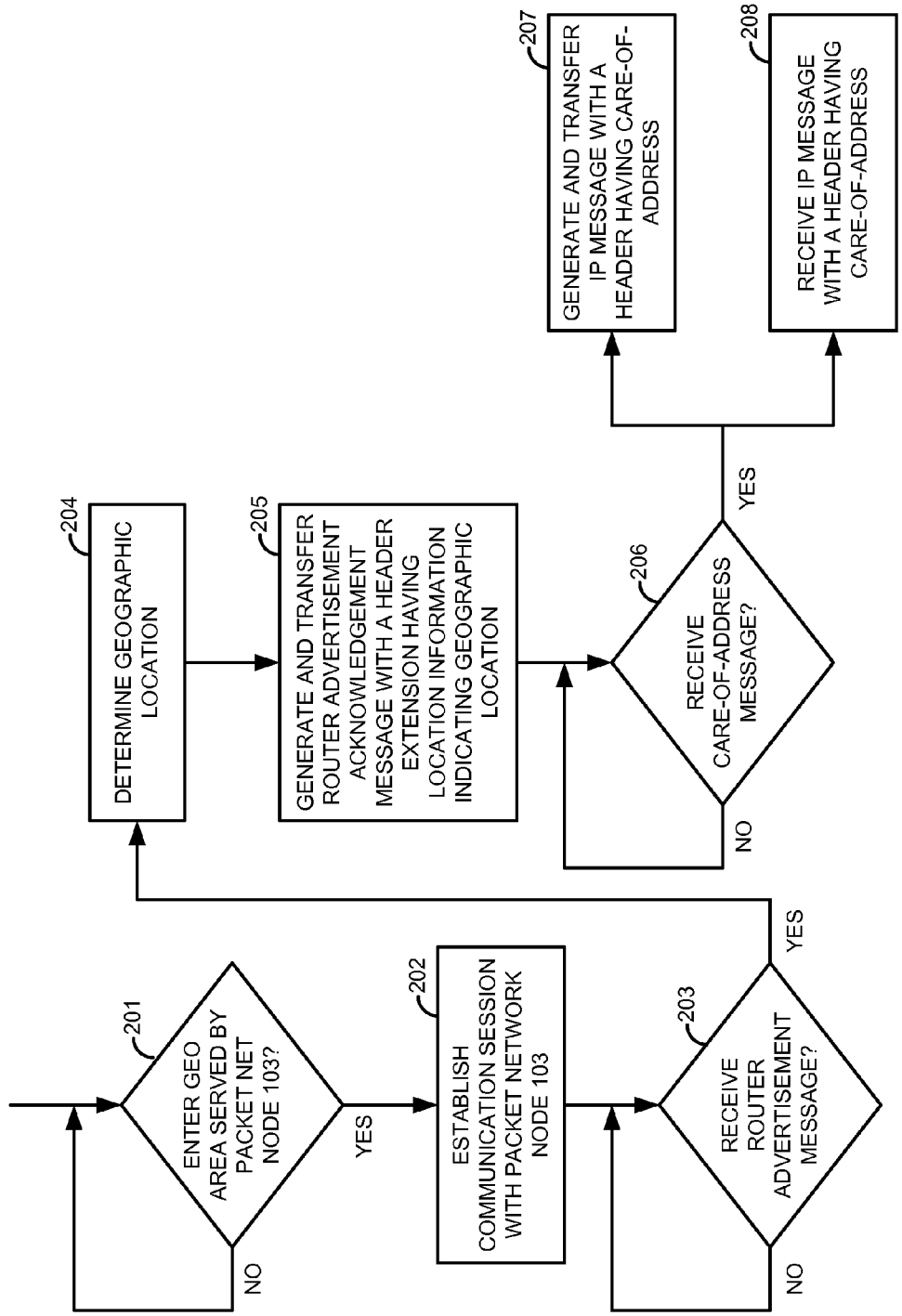
FIG. 2 illustrates a method of operating a wireless communication device to provide its geographic location to a packet network node.

FIG. 2 illustrates a method of operating wireless communication device 101 to provide its geographic location to packet network node 103. If wireless communication device enters a geographic area served by packet network node 103 (201), then wireless communication device 101 establishes a communication session with packet network node 103 over wireless communication network 102 (202). Wireless communication device 101 may determine that it has entered this geographic area by receiving and processing a pilot signal from wireless communication network 102, receiving and processing Global Position Satellite (GPS) signals to determine location, or through some other technique. The communication session could be a Proxy Mobile Internet Protocol (PMIP) call set-up session using Internet Protocol Version Six (IPv6), or another type of wireless communication session that uses some other suitable communication protocol.

If wireless communication device 101 receives a router advertisement message from packet network node 103 over wireless communication network 102 (203), then wireless communication device 101 determines its geographic location (204) and generates an acknowledgement message to the router advertisement message (205). Wireless communication device 101 may determine its geographic location by receiving and processing a wireless location signal from wireless communication network 102, receiving and processing GPS signals, radio signal triangulation, or through some other location determination technique. Note that wireless communication device 101 may periodically determine its geographic location, and in this context, determining the location in step 204 may comprise reading the pre-determined location from memory. Also note that the geographic location may be approximate or representative of the exact location of device 101.

Wireless communication device 101 generates the acknowledgement message to include a header extension that has location information that indicates the geographic location (205). Wireless communication device 101 transfers the acknowledgement message to packet network node 103 over wireless communication network 102 (205). If wireless communication device 101 receives a Care-of-Address (CoA) from packet network node 103 over wireless communication network 102 (206), then wireless communication device 101 generates and transfers IP messages (207) and receives IP messages (208), where the IP messages have headers that include the CoA.

Figure 3:
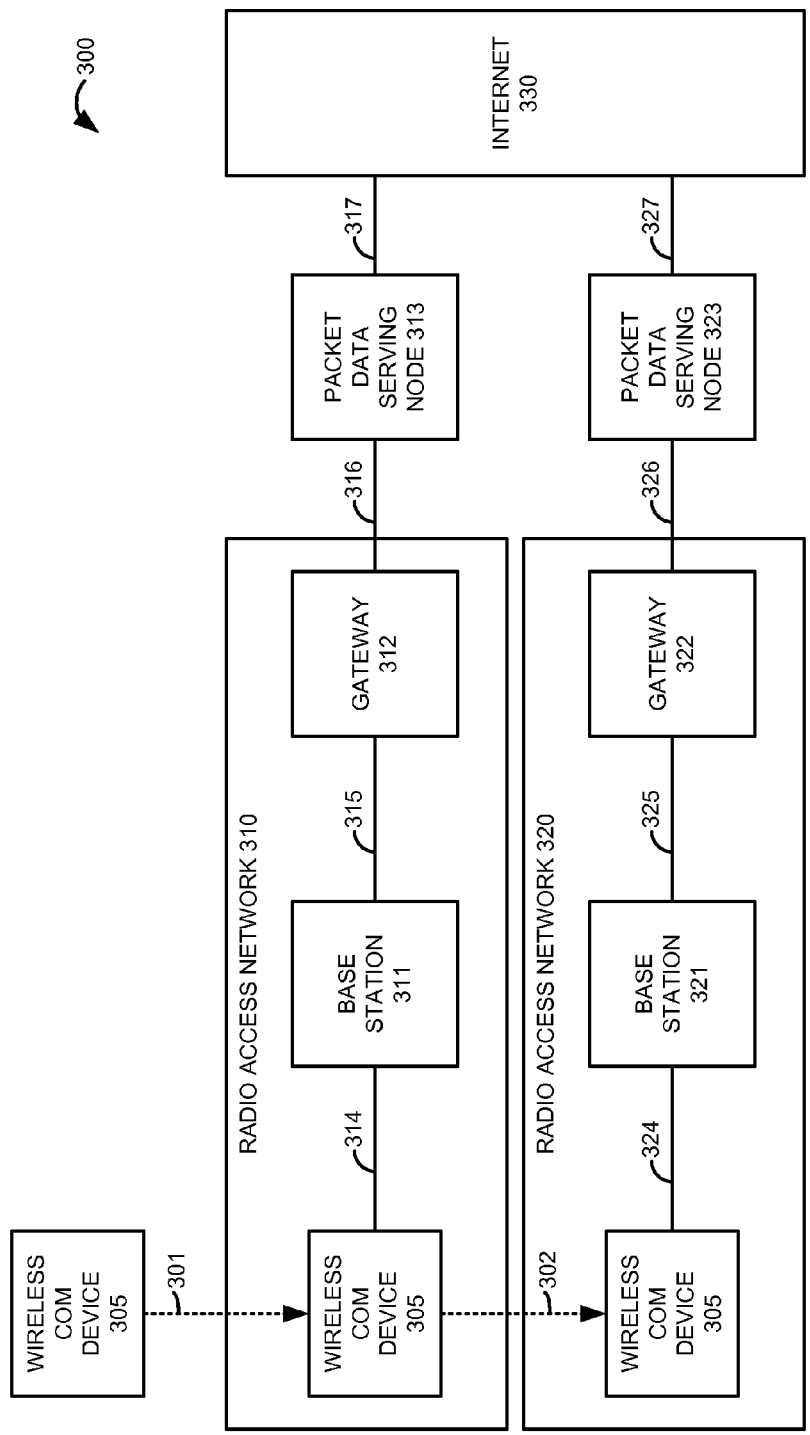
FIG. 3 illustrates a communication system where a wireless communication device provides its geographic location to packet data serving nodes that are coupled to radio access networks.

FIG. 3 illustrates communication system 300 where mobile wireless communication device 305 provides its geographic location to Packet Data Serving Nodes (PDSNs) 313 and 323 that are respectively coupled to Radio Access Networks (RANs) 310 and 320. Communication system 300 comprises mobile wireless communication device 305, RANs 310 and 320, PDSNs 313 and 323, and Internet 330. RAN 310 includes base station 311 and gateway 312. RAN 320 includes base station 321 and gateway 322. Communication system 300 is an example of communication system 100, although communication system 100 may use alternative configurations and operations.

The movement of mobile wireless communication device 305 is indicated on FIG. 3 by dashed arrows 301-302. Arrow 301 shows that mobile wireless communication device 305 moves into the geographic area of RAN 310 that is served by PDSN 313. Movement arrow 302 shows that mobile wireless communication device 305 then moves from RAN 310 into the geographic area of RAN 320 that is served by PDSN 323.

Mobile wireless communication device 305 and base station 311 communicate over wireless access link 314. Base station 311 and gateway 312 communicate over backhaul link 315. Gateway 312 and PDSN 313 communicate over network link 316. Gateway 313 and internet 330 communicate over network link 317. Mobile wireless communication device 305 and base station 321 communicate over wireless access link 324. Base station 321 and gateway 322 communicate over backhaul link 325. Gateway 322 and PDSN 323 communicate over network link 326. Gateway 323 and internet 330 communicate over network link 327.

Figure 4:
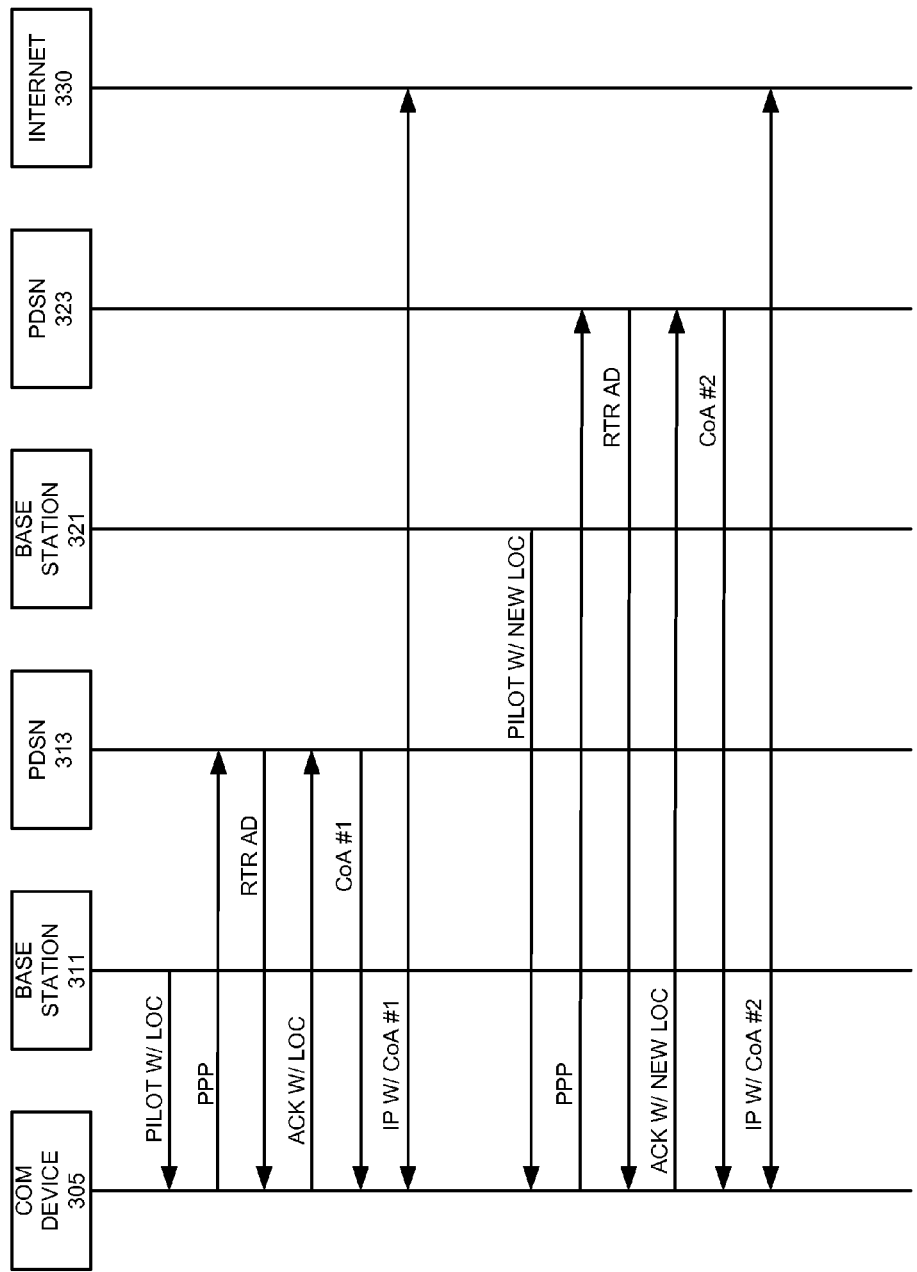
FIG. 4 illustrates a method of operating a communication system where a wireless communication device provides its geographic location to packet data serving nodes that are coupled to radio access networks.

FIG. 4 illustrates a method of operating communication system 300 where mobile wireless communication device 305 provides its geographic location to PDSNs 313 and 323. Base station 311 wirelessly broadcasts a pilot signal that indicates a latitude and longitude that corresponds to the geographic area of base station 311 (and RAN 310) that is served PDSN 313. The pilot signal may also identify base station 311. When wireless communication device 305 moves into RAN 310 (arrow 301), wireless communication device 305 receives and processes the pilot signal to determine this latitude and longitude. Wireless communication device 305 also receives and processes the pilot signal to establish a Point-Point Protocol (PPP) communication session with PDSN 313 over RAN 310. Wireless communication device 305 and PDSN 313 communicate to perform call set-up over the PPP communication session. The call set-up uses Proxy Mobile Internet Protocol (PMIP) Internet Protocol Version Six (IPv6).

As a part of the call set-up, a router in PDSN 313 transfers an IPv6 router advertisement message to wireless communication device 305 over RAN 310. The router advertisement message indicates a first address portion for PDSN 313. In response to the router advertisement message, wireless communication device transfers an IPv6 acknowledgement message to PDSN 313 over RAN 310. The acknowledgement message has a header with a destination address that includes the first address portion from the router advertisement message and that includes a second address portion that identifies wireless communication device 305. This second address portion could be a Media Access Control (MAC) address, Electronic Serial Number (ESN), Mobile Station Identifier (MSID), or some other identifying code for wireless communication device 305. The acknowledgement message also has an IPv6 header extension that includes the latitude and longitude from the pilot signal transmitted by base station 311.

A Dynamic Host Control Protocol (DHCP) server in PDSN 313 receives and processes the latitude and longitude from the acknowledgement message to select a first IPv6 Care-of-Address (CoA) for wireless communication device. The first CoA is an IP address that supports mobile internet service for wireless communication device 305. PDSN 313 transfers the first CoA to wireless communication device 305 over RAN 310. Wireless communication device 305 uses the first CoA to exchange IP messages with other devices over RAN 310, PDSN 313, and internet 330.

Subsequently, wireless communication device 305 moves into RAN 320 (arrow 302). Base station 321 wirelessly broadcasts its own pilot signal that indicates a new latitude and longitude that corresponds to the geographic area of base station 321 (and RAN 320) that is served by PDSN 323. This other pilot signal may also identify base station 321. When wireless communication device 305 moves into RAN 320, wireless communication device 305 receives and processes the pilot signal to determine this new latitude and longitude. Wireless communication device 305 also receives and processes the pilot signal to establish a PPP communication session with PDSN 323 over RAN 320. Wireless communication device 305 and PDSN 323 communicate to perform PMIP IPv6 call set-up over the PPP communication session.

As a part of the call set-up, a router in PDSN 323 transfers an IPv6 router advertisement message to wireless communication device 305 over RAN 320. The router advertisement message indicates a first address portion for PDSN 323. In response to the router advertisement message, wireless communication device 305 transfers an IPv6 acknowledgement message to PDSN 323 over RAN 320. The acknowledgement message has a header with a destination address that includes the first address portion from the router advertisement message and that includes a second address portion that identifies wireless communication device 305. This second address portion could be a MAC address, ESN, MSID, or some other identifying code for wireless communication device 305. The acknowledgement message also has an IPv6 header extension that includes the new latitude and longitude from the pilot signal transmitted by base station 321.

A DHCP server in PDSN 323 receives and processes the new latitude and longitude from the acknowledgement message to select a second IPv6 CoA for wireless communication device 305. The second CoA is also an IP address that supports mobile internet service for wireless communication device 305. PDSN 323 transfers the second CoA to wireless communication device 305 over RAN 320. Wireless communication device 305 uses the second CoA to exchange IP messages with other devices over RAN 320, PDSN 323, and internet 330.

Figure 5:
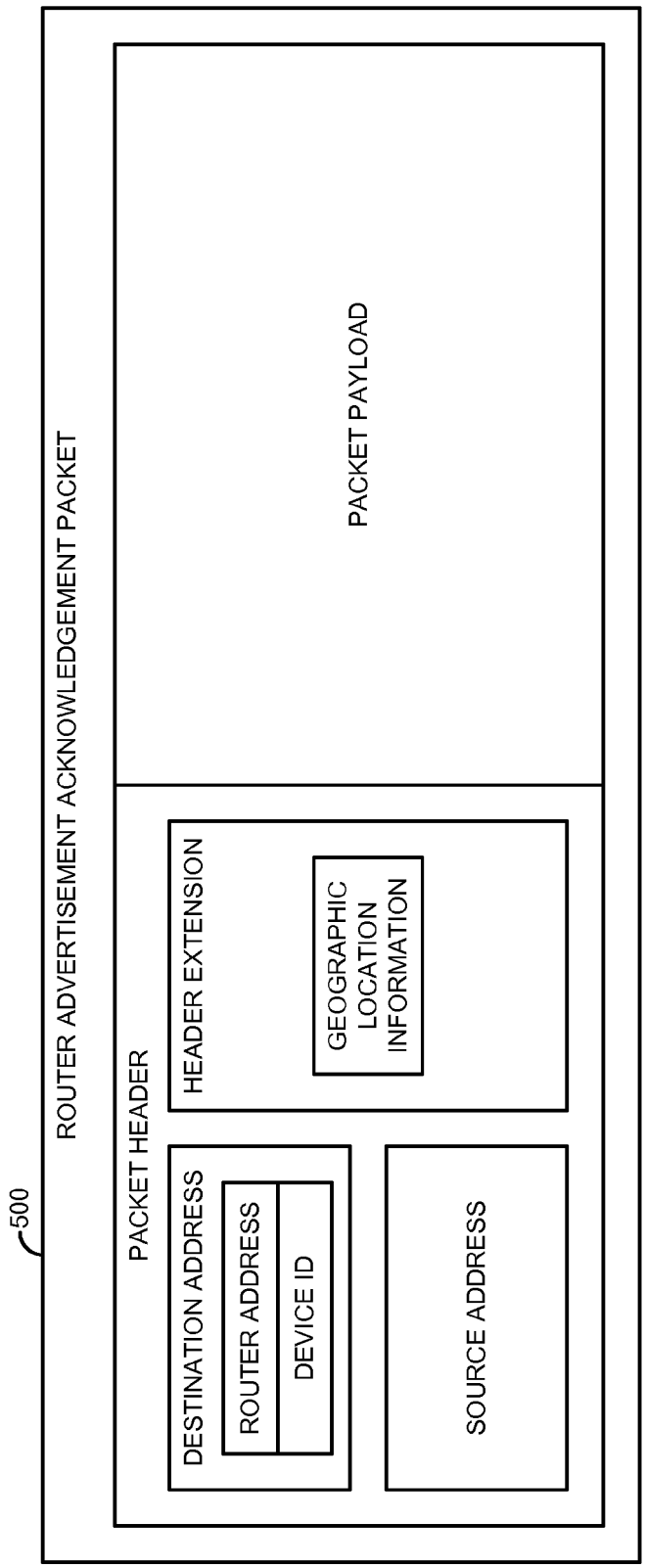
FIG. 5 illustrates a router advertisement acknowledgement packet that provides geographic location information to a packet data serving node.

FIG. 5 illustrates router advertisement acknowledgement packet 500 that provides geographic location information to a packet data serving node. Router advertisement acknowledgement packet 500 includes a packet header and a packet payload. The packet header includes a destination address, source address, and a header extension. The destination address includes two portions: 1) a router address for the PDSN router, and 2) a device ID for the device that is sending acknowledgement packet 500. The header extension includes geographic location information. The geographic location information corresponds to the geographic location of the device that is sending acknowledgement packet 500.

Figure 6:
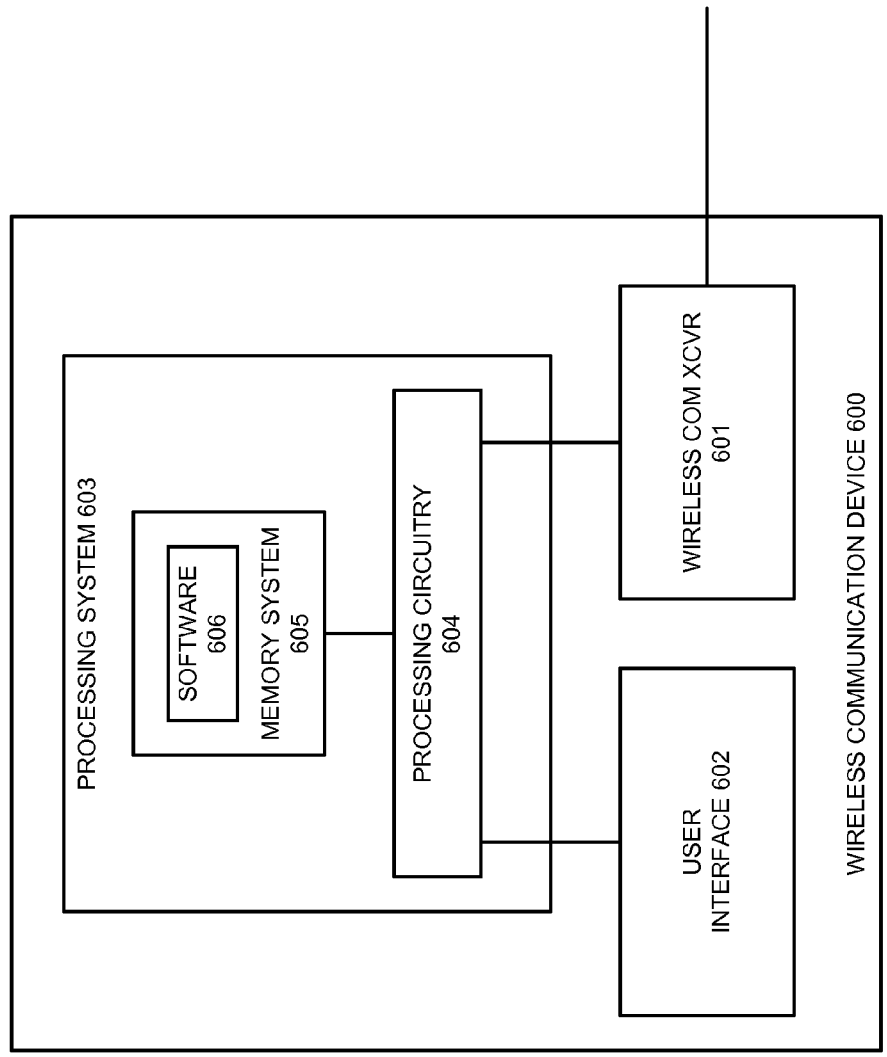
FIG. 6 illustrates a wireless communication device that provides its geographic location to a packet network node.

FIG. 6 illustrates wireless communication device 600 that provides its geographic location to a packet network node. Wireless communication device 600 is an example of wireless communication devices 101 and 305, although devices 101 and 305 may use alternative configurations. Wireless communication device 600 could be a discrete system, a distributed system, or could be integrated into other systems. Wireless communication device 600 comprises wireless communication transceiver 601, user interface 602, and processing system 603. Processing system 603 comprises processing circuitry 604 and memory system 605 that stores operating software 606. Processing system 603 is linked to communication transceiver 601 and user interface 602. Wireless communication device 600 may include other well-known components that are not shown for clarity, such as a battery, enclosure, GPS circuitry, camera, and additional communication interfaces.

Wireless communication transceiver 601 comprises an antenna, filter, amplifier, signal processing circuitry, software, and/or some other communication components. Communication transceiver 601 may use various formats for wireless communication, such as Code Division Multiple Access (CDMA), Evolution Data Only (EVDO), Worldwide Interoperability for Microwave Access (WIMAX), High Speed Packet Access (HSPA), Long Term Evolution (LTE), or some other wireless communication format—including combinations thereof. Wireless communication transceiver 601 transmits and receives wireless communications, including pilot signals, router advertisement messages, acknowledgement messages, CoA messages, and IP messages, as described herein for devices 101 and 305.

User interface 602 includes components to interact with a user, such as keys, displays, lights, touch-pads, switches, microphones, speakers, and the like.

Processing circuitry 604 comprises microprocessor and other circuitry that retrieves and executes operating software 606 from memory system 605. Memory system 605 comprises a computer-readable storage medium, such as a disk drive, flash drive, data storage circuitry, or some other memory apparatus. Memory system 605 could be a single device or be distributed across multiple devices. Processing circuitry 604 is typically mounted on one or more circuit boards that may also hold memory system 605 and portions of communication transceiver 601 and user interface 602.

Operating software 606 comprises computer programs, firmware, or some other form of computer-readable processing instructions. Operating software 606 may include an operating system, utilities, drivers, network interfaces, applications, or some other type of software. When executed by processing circuitry 604, operating software 606 directs processing system 603 to operate wireless communication device 600 as described herein for wireless communication devices 101 and 305. In particular, operating software 606 directs processing system 603 to indicate its geographic location when acknowledging router advertisement messages.

Referring back to FIG. 1, wireless communication device 101 comprises an antenna and RF communication circuitry for wireless communication. The RF communication circuitry typically includes an amplifier, filter, RF modulator, and signal processing circuitry. The signal processing circuitry implements a wireless communication format. Wireless communication device 101 may also comprise processing circuitry, memory, software, and a user interface.

Wireless communication network 102 comprises antennas and RF communication circuitry for wireless communication. The RF communication circuitry typically includes amplifiers, filters, RF modulators, and signal processing circuitry. The signal processing circuitry implements the wireless communication format. Wireless communication network 102 also comprises processing circuitry, memory, software, and network communication interfaces. Wireless communication network 102 may also include routers, servers, call processors, computer systems, communication links, and other communication network elements.

Packet network node 103 comprises processing circuitry, memory, software, and network communication interfaces. Packet network node 103 may include routers, servers, and other network components. Packet communication network 104 comprises routers, network links, servers, and other network elements.

Wireless communication link 111 uses the air or space as the transport media. Wireless communication link 111 may use various protocols, such as CDMA, EVDO, WIMAX, HSPA, LTE, or some other wireless communication format—including combinations thereof. Wireless communication link 111 could be a direct link or may include intermediate networks, systems, or devices.

Communication links 112-113 use metal, glass, air, space, or some other material as the transport media. Communication links 112-113 use various communication protocols, such as TDM, IP, Ethernet, wireless, or some other communication format—including combinations thereof. Communication links 112-113 could be direct links or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device comprising:
   receiving a pilot signal from a wireless access node indicating at least a geographic location of the wireless access node;
   receiving a router advertisement message transferred by a packet network node;
   in response to the router advertisement message, generating a router advertisement acknowledgement message having a header extension that includes at least the geographic location of the wireless access node;
   transmitting the router advertisement acknowledgement message for delivery to the packet network node and responsively receiving a care-of-address transferred by the packet network node that is associated with the geographic location of the wireless access node; and
   exchanging user communication packets using the care-of-address.

2. The method of claim 1 further comprising entering a geographical area served by the packet network node, and in response, establishing a communication session with the packet network node, and wherein receiving the router advertisement message comprises receiving the router advertisement message over the communication session.

3. The method of claim 1 further comprising wirelessly transferring an internet protocol message having the care-of-address.

4. The method of claim 1 further comprising wirelessly receiving an internet protocol message having the care-of-address.

5. The method of claim 1 wherein the header extension comprises an internet protocol version six header extension.

6. The method of claim 5 wherein:
   the router advertisement message indicates a first address portion for the packet network node;
   the router advertisement acknowledgement message includes a destination address including the first address portion and including a second address portion that identifies the wireless communication device.

7. The method of claim 1 wherein the packet network node comprises a packet data serving node in a radio access network.

8. A wireless communication device comprising:
   a communication transceiver configured to receive a pilot signal from a wireless access node indicating at least a geographic location of the wireless access node, and receive a router advertisement message transferred by a packet network node;
   a processing system configured to, in response to the router advertisement message, generate a router advertisement acknowledgement message having a header extension that includes at least the geographic location of the wireless access node;

the communication transceiver configured to transmit the router advertisement acknowledgement message for delivery to the packet network node and responsively receive a care-of-address transferred by the packet network node that is associated with the geographic location of the wireless access node; and the communication transceiver configured to exchange user communication packets using the care-of-address.

9. The wireless communication device of claim 8 wherein the communication transceiver is configured to wirelessly receive the pilot signal indicating that the wireless communication device has entered a geographical area served by the packet network node, and in response, the processing system is configured to direct the communication transceiver to establish a communication session with the packet network node, and wherein the router advertisement message is received over the communication session.

10. The wireless communication device of claim 8 wherein the processing system is configured to direct the communication transceiver to wirelessly transmit an internet protocol message having the care-of-address.

11. The wireless communication device of claim 8 wherein the processing system is configured to process an internet protocol message having the care-of-address that was wirelessly received by the communication transceiver.

12. The wireless communication device of claim 8 wherein the header extension comprises an internet protocol version six header extension.

13. The wireless communication device of claim 12 wherein:

the router advertisement message indicates a first address portion for the packet network node;

the router advertisement acknowledgement message includes a destination address including the first address portion and including a second address portion that identifies the wireless communication device.

14. The wireless communication device of claim 8 wherein the packet network node comprises a packet data serving node in a radio access network.

* * * * *